(12) United States Patent
Hatada

(10) Patent No.: US 8,557,463 B2
(45) Date of Patent: Oct. 15, 2013

(54) FUEL CELL SYSTEM AND METHOD FOR LOAD FOLLOWING OPERATION OF THE SAME

(75) Inventor: Susumu Hatada, Kanagawa (JP)

(73) Assignee: JX Nippon Oil Energy Corporation (JP)

( * ) Notice: Subject to any disclaimer, the term of this patent is extended or adjusted under 35 U.S.C. 154(b) by 365 days.

(21) Appl. No.: 12/934,981

(22) PCT Filed: Feb. 18, 2009

(86) PCT No.: PCT/JP2009/052744
§ 371 (c)(1),
(2), (4) Date: Sep. 27, 2010

(87) PCT Pub. No.: WO2009/119187
PCT Pub. Date: Oct. 1, 2009

(65) Prior Publication Data
US 2011/0039174 A1  Feb. 17, 2011

(30) Foreign Application Priority Data

Mar. 27, 2008 (JP) ................................. 2008-083634
Mar. 27, 2008 (JP) ................................. 2008-083635

(51) Int. Cl.
*H01M 8/04* (2006.01)

(52) U.S. Cl.
USPC ........................................ 429/443; 429/425

(58) Field of Classification Search
None
See application file for complete search history.

(56) References Cited

U.S. PATENT DOCUMENTS

| 2004/0038095 A1 | 2/2004 | Kushibiki et al. | |
| 2005/0208664 A1* | 9/2005 | Keegan et al. | 436/55 |
| 2005/0214607 A1* | 9/2005 | Imahashi et al. | 429/23 |

FOREIGN PATENT DOCUMENTS

| JP | 60-56374 A | 4/1985 |
| JP | 63-314769 A | 12/1988 |
| JP | 2001-185196 A | 7/2001 |
| JP | 2004-178962 A | 6/2004 |
| JP | 2004-319420 A | 11/2004 |
| JP | 2006-8458 A | 1/2006 |
| JP | 2006-32262 A | 2/2006 |
| JP | 2006-107956 A | 4/2006 |
| JP | 2007-220620 A | 8/2007 |

OTHER PUBLICATIONS

International Search Report for Application No. PCT/JP2009/052744 with English translation mailed Mar. 24, 2009.
Extended European Search Report for Application No./Patent No. 09724129.3-1227/2267827, dated Mar. 15, 2012.

* cited by examiner

*Primary Examiner* — Patrick Ryan
*Assistant Examiner* — Muhammad Siddiquee
(74) *Attorney, Agent, or Firm* — Cantor Colburn LLP

(57) ABSTRACT

A method of load following operation of a fuel cell system may include measuring a temperature of the reforming catalyst layer, obtaining a reformable flow rate of the hydrocarbon-based fuel capable of being reformed in the reforming catalyst layer at the temperature, and controlling electric power generation based on the relationship between the reformable flow rate and a minimum value.

13 Claims, 2 Drawing Sheets

US 8,557,463 B2

FUEL CELL SYSTEM AND METHOD FOR LOAD FOLLOWING OPERATION OF THE SAME

This is a U.S. national stage application of International Application No. PCT/JP2009/052744, filed on 18 Feb. 2009. Priority under 35 U.S.C. §119(a) and 35 U.S.C. §365(b) is claimed from Japanese Application No. JP2008-083634, filed 27 Mar. 2008 and Japanese Application No. JP2008-083635, filed 27 Mar. 2008, the disclosure of which is also incorporated herein by reference.

TECHNICAL FIELD

The present invention relates to a fuel cell system that generates electric power using a reformed gas obtained by reforming a hydrocarbon-based fuel, such as kerosene.

BACKGROUND ART

A solid oxide fuel cell (hereinafter sometimes referred to as SOFC) system usually includes a reformer for reforming a hydrocarbon-based fuel, such as kerosene and city gas, to generate a hydrogen-containing gas (reformed gas), and an SOFC for electrochemically reacting the reformed gas and air for electric power generation.

The SOFC is usually operated at a high temperature of 550 to 1000° C.

Various reactions, such as steam reforming (SR), partial oxidation reforming (POX), and autothermal reforming (ATR), are used for reforming, and heating to a temperature at which catalytic activity is exhibited is necessary for using a reforming catalyst.

Steam reforming is a very largely endothermic reaction. Also, the reaction temperature of the steam reforming is 550 to 750° C., which is relatively high, and the steam reforming requires a high temperature heat source. Therefore, an internal reforming SOFC is known in which a reformer (internal reformer) is installed near an SOFC, and the reformer is heated mainly using radiant heat from the SOFC as a heat source (Patent Document 1).

Also, proposals on the load following operation of a fuel cell system are made in Patent Documents 2 and 3.
Patent Document 1: JP2004-319420A
Patent Document 2: JP2001-185196A
Patent Document 3: JP2006-32262A

DISCLOSURE OF THE INVENTION

Problems to be Solved by the Invention

When a hydrocarbon-based fuel is not reformed to a predetermined composition, and an unreformed component is supplied to an SOFC, anode degradation and flow blockage due to carbon deposition may occur, particularly when a heavy hydrocarbon, such as kerosene, is used as the hydrocarbon-based fuel.

An SOFC system may be subjected to load following operation. In other words, an SOFC system may be subjected to an operation in which the amount of electric power generation of the SOFC system is varied according to the fluctuation of electric power demand. For example, when the amount of electric power generation is increased, the feed rate of the hydrocarbon-based fuel to the SOFC system may be increased. In such a case, carbon may be deposited. Therefore, it is desired to reliably reform the hydrocarbon-based fuel also in the load following operation. In the arts disclosed in Patent Documents 2 and 3, improvement is still desired in terms of performing reliable reforming.

This is true not only for the SOFC system, but also for a fuel cell system having a high temperature fuel cell, such as a molten carbonate fuel cell (MCFC).

It is an object of the present invention to provide a method in which, when performing load following operation of a fuel cell system including a reformer having a reforming catalyst layer and a high temperature fuel cell, reforming can be more reliably performed to more reliably prevent flow blockage and anode degradation.

It is another object of the present invention to provide a fuel cell system suitable for performing such a method.

Means for Solving the Problems

The present invention provides a method for performing load following operation of a fuel cell system including a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the method including:

A) measuring a temperature T of the reforming catalyst layer;

B) obtaining a reformable flow rate $F^R$ that is a flow rate of the hydrocarbon-based fuel that can be reformed in the reforming catalyst layer at the temperature T;

C) when the reformable flow rate $F^R$ is smaller than the minimum value $F_{min}$, stopping electric power generation in the fuel cell; and D) when the reformable flow rate $F^R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) if there exists, among all $P_i$, a $P_i$ that is equal to the fuel cell output demand value $P_D$, then setting $F_i$, that corresponds to $P_i$, that is equal to $P_D$, as $F_{DS}$;

if there does not exist, among all $P_i$, a $P_i$ that is equal to the fuel cell output demand value $P_D$, then setting $F_i$, that is the not smaller one of the two Fi, as $F_{DS}$; one of said two Fi corresponding to the smallest $P_i$ that exceeds $P_D$, and the other one of said two $F_i$ corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ that corresponds to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

A first embodiment of the present invention provides a method for performing load following operation of a fuel cell system including a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the method including:

1-A) measuring a temperature of the reforming catalyst layer;

1-B) calculating a reformable flow rate $F^R$ that is a flow rate of the hydrocarbon-based fuel that can be reformed in the reforming catalyst layer, based on the measured temperature of the reforming catalyst layer;

1-C) when the calculated reformable flow rate $F^R$ is smaller than the minimum value $F_{min}$, stopping electric power generation in the fuel cell; and 1-D) when the calculated reformable flow rate $F^R$ is equal to or more than the minimum value $F_{min}$, performing step 1-d1 if a fuel cell output demand value $P_D$ is equal to or less than the maximum electrical output $P_M$, and performing step 1-d2 if the fuel cell output demand value $P_D$ exceeds the maximum electrical output $P_M$, 1-d1) if there exists, among all $P_i$, a $P_i$ that is equal to the fuel cell output demand value $P_D$, then setting $F_i$, that corresponds to $P_i$, that is equal to $P_D$, as $F_{DS}$, if there does not exist, among all $P_i$, a $P_i$ that is equal to the fuel cell output demand value $P_D$, then setting $F_i$, that is the not smaller one of the two Fi, as $F_{DS}$; one of said two Fi corresponding to the smallest $P_i$ that exceeds $P_D$ and the other one of said two $F_i$ corresponding to the largest $P_i$ that is less than $P_D$, when $F_{DS}$ is equal to or less than the calculated reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the calculated reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, 1-d2) when $F_M$ that is $F_i$, corresponding to the maximum electrical output $P_M$, is equal to or less than the calculated reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the calculated reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ that corresponds to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

A second embodiment of the present invention provides a method for performing load following operation of a fuel cell system including a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, and a plurality of temperatures $T_j$ of the reforming catalyst layer (j is an integer of 1 or more and N or less, where N is an integer of 2 or more) and a flow rate $G_j$ of the hydrocarbon-based fuel that corresponds to each $T_j$ are set beforehand, where each $G_j$ is a flow rate of the hydrocarbon-based fuel that can be reformed in the reforming catalyst layer at a corresponding reforming catalyst layer temperature $T_j$, each $G_j$ is larger than 0, and $G_j$ is the same value or increases with an increase of j, the method including:

2-A) measuring a temperature T of the reforming catalyst layer;

2-B) adopting $G_j$ corresponding to a largest $T_j$ that is equal to or less than the temperature T as a reformable flow rate $F^R$ that is a flow rate of the hydrocarbon-based fuel that can be reformed in the reforming catalyst layer at the temperature T;

2-C) when the reformable flow rate $F^R$ is smaller than the minimum value $F_{min}$, stopping electric power generation in the fuel cell; and 2-D) when the reformable flow rate $F^R$ is equal to or more than the minimum value $F_{min}$, performing step 2-d1 if a fuel cell output demand value $P_D$ is equal to or less than the maximum electrical output $P_M$, and performing step 2-d2 if the fuel cell output demand value $P_D$ exceeds the maximum electrical output $P_M$, 2-d1) if there exists, among all $P_i$, a $P_i$ that is equal to the fuel cell output demand value $P_D$, then setting $F_i$, that corresponds to $P_i$, that is equal to $P_D$, as $F_{DS}$;

if there does not exist, among all $P_i$, a $P_i$ that is equal to the fuel cell output demand value $P_D$, then setting $F_i$, that is the not smaller one of the two Fi, as $F_{DS}$; one of said two Fi corresponding to the smallest $P_i$ that exceeds $P_D$, and the other one of the two $F_i$ corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, 2-d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ that corresponds to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

Steps A to D, steps 1-A to 1-D, or steps 2-A to 2-D may be repeatedly performed during the load following operation.

The hydrocarbon-based fuel may include a hydrocarbon-based fuel(s) with a carbon number of two or more.

The concentration of a compound(s) with a carbon number of two or more in the reformed gas may be 50 ppb or less on a mass basis.

The present invention provides a fuel cell system including a reformer having a reforming catalyst layer, for reforming a hydrocarbon-based fuel to produce a reformed gas containing hydrogen, and a high temperature fuel cell for generating electric power using the reformed gas, wherein a plurality of electrical outputs of the fuel cell are represented as $P_i$ (i is an integer of 1 or more and M or less, where M is an integer of 2 or more), and a flow rate of the hydrocarbon-based fuel that corresponds to each $P_i$ is represented as $F_i$, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the system including:

I) a means for measuring a temperature T of the reforming catalyst layer;

II) a means for obtaining a reformable flow rate $F^R$ that is a flow rate of the hydrocarbon-based fuel that can be reformed in the reforming catalyst layer at the temperature T;

III) a means for, when the reformable flow rate $F^R$ is smaller than the minimum value $F_{min}$, stopping electric power generation in the fuel cell; and IV) a means for, when the reformable flow rate $F^R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) if there exists, among all $P_i$, a $P_i$ that is equal to the fuel cell output demand value $P_D$, then setting $F_i$, that corresponds to that is equal to $P_D$, as $F_{DS}$;

if there does not exist, among all $P_i$, a $P_i$ that is equal to the fuel cell output demand value $P_D$, then setting $F_i$, that is the not smaller one of the two Fi, as $F_{DS}$; one of said two Fi corresponding to the smallest $P_i$ that exceeds $P_D$, and the other of said two $F_i$ corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ that corresponds to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

Advantages of the Invention

The present invention provides a method in which, when performing load following operation of a fuel cell system including a reformer having a reforming catalyst layer and a high temperature fuel cell, reforming can be more reliably performed to more reliably prevent flow blockage and anode degradation.

Also, the present invention provides a fuel cell system suitable for performing such a method.

DESCRIPTION OF SYMBOLS

| 1  | water vaporizer |
| --- | --- |
| 2  | electrical heater annexed to water vaporizer |
| 3  | reformer |
| 4  | reforming catalyst layer |
| 5  | thermocouple |
| 6  | SOFC |
| 7  | igniter |
| 8  | module container |
| 9  | electrical heater annexed to reformer |
| 10 | computer |
| 11 | flow rate control valve |
| 12 | flowmeter |
| 13 | thermocouple |
| 14 | electric power conditioner |

BEST MODE FOR CARRYING OUT THE INVENTION

A fuel cell system used in the present invention includes a reformer for reforming a hydrocarbon-based fuel to produce a hydrogen-containing gas, and a high temperature fuel cell. The reformer includes a reforming catalyst layer. The hydrogen-containing gas obtained from the reformer is referred to as reformed gas. The reforming catalyst layer is composed of a reforming catalyst that can promote a reforming reaction. The high temperature fuel cell generates electric power, using the hydrogen-containing gas (reformed gas) obtained from the reformer.

The embodiments of the present invention will be described below, using drawings, but the present invention is not limited thereto.

[Indirect Internal Reforming SOFC System]

Figure 1:
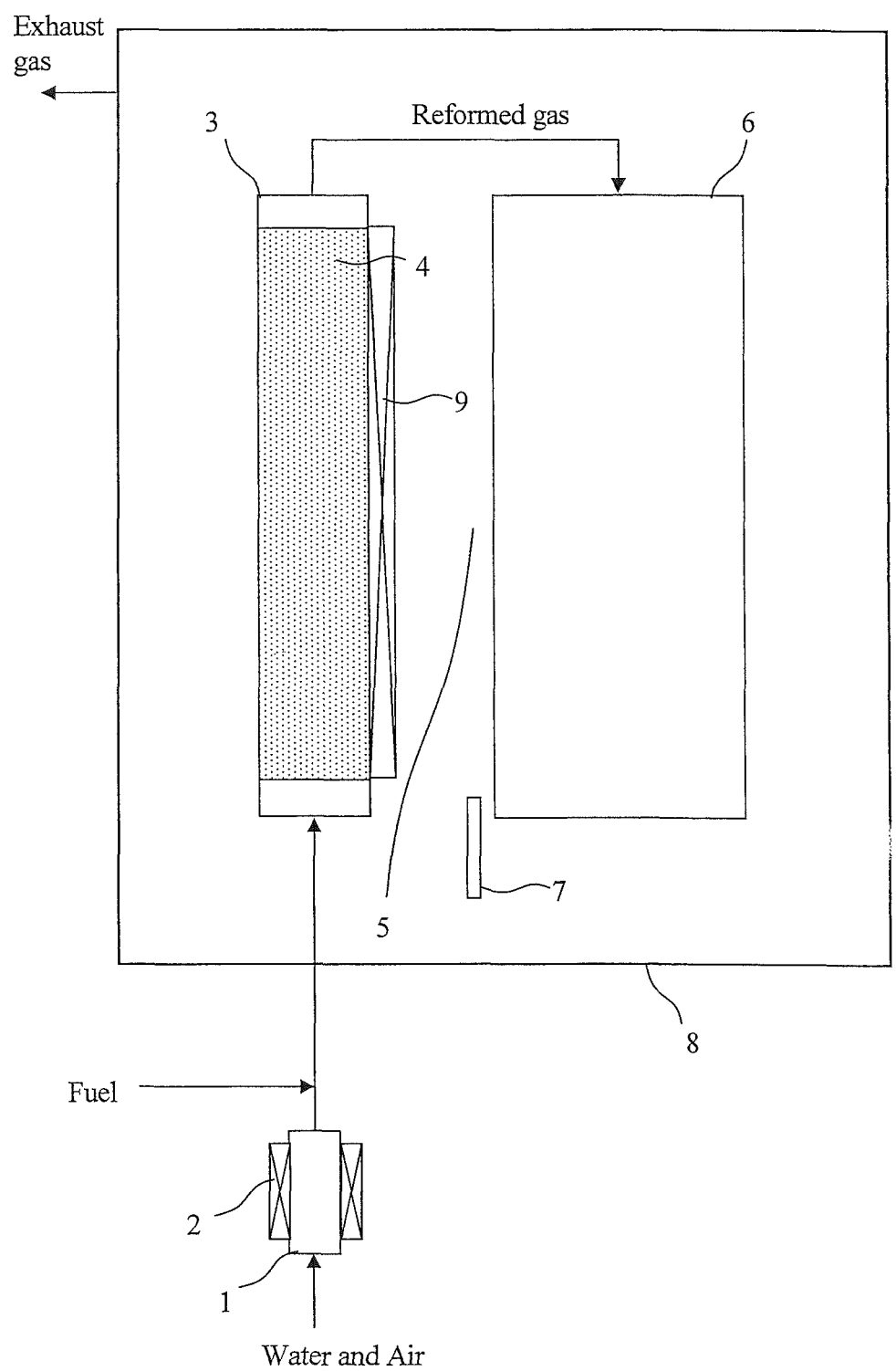
FIG. 1 is a schematic diagram showing the outline of an example of an indirect internal reforming SOFC system that can perform the present invention.

One embodiment of an indirect internal reforming SOFC that can perform the present invention is schematically shown in FIG. 1. Here, the indirect internal reforming SOFC system will be described, but the present invention can also be applied to an external reforming SOFC system or an MCFC system.

The indirect internal reforming SOFC includes a reformer 3 for reforming a hydrocarbon-based fuel to produce a reformed gas (hydrogen-containing gas). The reformer includes a reforming catalyst layer 4.

The indirect internal reforming SOFC includes an SOFC 6 for generating electric power using the above reformed gas, and also includes a combustion region 5 for combusting an anode off-gas discharged from the SOFC (particularly the anode of the SOFC).

The indirect internal reforming SOFC includes an enclosure 8 for housing the reformer, the solid oxide fuel cell, and the combustion region.

The indirect internal reforming SOFC refers to the enclosure (module container) 8 and equipment included in the interior of the enclosure.

In the indirect internal reforming SOFC in the embodiment shown in FIG. 1, an igniter 7 that is an ignition means for igniting the anode off-gas is provided, and also, the reformer is equipped with an electrical heater 9.

Each supply gas is supplied to the reformer or the SOFC, after being appropriately preheated as required.

A water vaporizer 1 equipped with an electrical heater 2 is connected to the indirect internal reforming SOFC, and piping for supplying the hydrocarbon-based fuel to the reformer is connected to the midstream of connection piping for the water vaporizer 1. The water vaporizer 1 generates steam by heating with the electrical heater 2. The steam may be supplied to the reforming catalyst layer after being appropriately superheated in the water vaporizer or downstream thereof.

Also, air (for a partial oxidation reforming reaction) may be supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with the hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

The reformed gas obtained from the reformer is supplied to the SOFC 6, particularly to the anode of the SOFC 6. Although not shown, air is appropriately preheated and supplied to the cathode of the SOFC.

Combustible components in the anode off-gas (gas discharged from the anode) are combusted by oxygen in a cathode off-gas (gas discharged from the cathode) at the SOFC outlet. In order to do this, ignition using the igniter 7 is possible. The outlets of both the anode and the cathode are open in the module container 8. The combustion gas is appropriately discharged from the module container.

The reformer and the SOFC are housed in one module container and modularized. The reformer is disposed at a position where it can receive heat from the SOFC. For example, when the reformer is located at a position where it receives thermal radiation from the SOFC, the reformer is heated by thermal radiation from the SOFC during electric power generation.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

The reformer 3 is heated by the combustion heat of the anode off-gas generated in the combustion region 5. Also, when the temperature of the SOFC is higher than that of the reformer, the reformer is also heated by radiation heat from the SOFC.

Further, the reformer may be heated by heat generation by reforming. When the reforming is partial oxidation reforming, or when the reforming is autothermal reforming and heat generation by a partial oxidation reforming reaction is larger than endothermic heat by a steam reforming reaction, heat is generated with the reforming.

[Load Following Operation Method (First Embodiment)]

In the present invention, a plurality of electrical outputs $P_i$ of the fuel cell (i is an integer of 1 or more and M or less, where M is an integer of 2 or more) and a flow rate $F_i$ of the hydrocarbon-based fuel that corresponds to each Rare beforehand set.

Each $F_i$ is a flow rate of the hydrocarbon-based fuel required to be supplied to the reforming catalyst layer in order to output the corresponding electrical output $P_i$ from the fuel cell. For example, the flow rate $F_i$ of the hydrocarbon-based fuel that corresponds to each $P_i$ may be set by beforehand determining an electric current and a fuel utilization rate for each $P_i$ by preliminary experiment, simulation, or the like so that the electric power generation efficiency is as high as possible, while the SOFC is maintained at a temperature at which electric power can be preferably generated.

Also, the flow rates of fluids supplied to the indirect internal reforming SOFC, other than the hydrocarbon-based fuel, and the input and output of electricity to and from the indirect internal reforming SOFC, other than the output of the fuel cell, may be beforehand set correspondingly to each $P_i$, as required. For example, in order to suppress carbon deposition, the flow rate of water supplied to the reformer may be set so that the steam/carbon ratio (ratio of the number of moles of water molecules to the number of moles of carbon atoms in the gas supplied to the reforming catalyst layer) is a predetermined value. The flow rate of air supplied to the reformer may be set so that the oxygen/carbon ratio (ratio of the number of moles of oxygen molecules to the number of moles of carbon atoms in the gas supplied to the reforming catalyst layer) is a predetermined value. The flow rate of fluids supplied to the indirect internal reforming SOFC, other than the water and air supplied to the reformer, and the input and output of electricity to and from the indirect internal reforming SOFC may be set by preliminary experiment, simulation, or the like so that the electric power generation efficiency is as high as possible, while the SOFC is maintained at a temperature at which electric power can be preferably generated. By doing so, these flow rates and electrical input and output may be determined using beforehand obtained functions, when the output of the fuel cell is set to a certain value P.

Each $P_i$ is 0 or more. In other words, for all i, $0 \leq P_i$. Also, $P_i$ increases with the increase of i. In other words, $P_i < P_{i+1}$ (here, i is an integer of 1 or more and M−1 or less). Therefore, $P_i$ that may be actually zero is only $P_1$.

Further, each $F_i$ is larger than 0. In other words, for all i, $0 < F_i$.

$P_i$ when i is M (that is, $P_M$) is the maximum electrical output of the fuel cell. $P_M$ is beforehand determined as one of the specifications of the fuel cell system.

The minimum value among all $F_i$ is represented as $F_{min}$.

It is preferred to make M as large as possible within the allowable range of the memory of a control means, in terms of electric power generation efficiency.

By preferably repeatedly performing steps 1-A to 1-D, that is, repeatedly performing the step 1-A, the step 1-B, and the step 1-C or 1-D in this order, during load following operation, reforming can be more reliably performed to more reliably prevent the degradation of the anode.

[Step 1-A]

When load fluctuation operation is actually performed, the step 1-A of measuring the temperature of the reforming catalyst layer is performed. This measurement may be continuously performed while the load following operation is performed.

The step 1-A is performed to find the temperature T of the reforming catalyst layer used when a reformable flow rate $F^R$ described later is calculated. The step 1-A is preferably started in a time as short as possible from the point of time of the start of the load following operation. The step 1-A is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step 1-B]

In the step 1-B, the flow rate of the hydrocarbon-based fuel that can be reformed in the reforming catalyst layer (reformable flow rate $F^R$) is calculated based on the measured temperature of the reforming catalyst layer. The calculation method will be described in detail later.

[Step 1-C]

When the reformable flow rate $F^R$ calculated in the step 1-B is smaller than the minimum value $F_{min}$, electric power generation in the fuel cell is stopped. In other words, when $F^R < F_{min}$, the requisite minimum reformed gas cannot be reformed, and therefore, the electrical output of the fuel cell is set to zero. In this case, it is possible to supply the hydrocarbon-based fuel at the flow rate $F^R$ to the reformer and increase the temperature of the reforming catalyst layer by a heater annexed to the reformer, a burner, or the like until at least $F^R \geq F_{min}$ is satisfied. When $F^R \geq F_{min}$, the step 1-D and the subsequent steps may be performed.

[Step 1-D]

When the reformable flow rate $F^R$ calculated in the step 1-B is equal to or more than the minimum value $F_{min}$, the step 1-D is performed.

In the step 1-D, when a fuel cell output demand value $P_D$ is equal to or less than the maximum electrical output $P_M$ of the fuel cell, step 1-d1 is performed. $P_D \leq P_M$ means that the fuel cell can output the fuel cell output demand value $P_D$.

Or, when the fuel cell output demand value $P_D$ exceeds the maximum electrical output $P_M$ of the fuel cell, step 1-d2 is performed. $P_D > P_M$ means that the electrical output of the fuel cell is insufficient for the fuel cell output demand value $P_D$.

<Step 1-d1>

In the step 1-d1, first, in order to make a further judgment, a value of $F_{DS}$ is obtained. Here, $F_{DS}$ has a meaning of a flow rate of the hydrocarbon-based fuel corresponding to a $P_i$ which is close to the fuel cell output demand value $P_D$, obtained for judging on the safe side whether reforming is possible or not.

Whether there is, among all $P_i$ beforehand set, a $P_i$ that is equal to the fuel cell output demand value $P_D$ is checked.

When there is a $P_i$ that is equal to $P_D$, $F_i$ that corresponds to the $P_i$ (=$P_D$) is obtained using the correspondence relationship between $P_i$ and $F_i$, which has been beforehand set, and this $F_i$ is set as $F_{DS}$. Also in the following descriptions, when obtaining $F_i$ that corresponds to $P_i$, or $P_i$ that corresponds to $F_i$, the correspondence relationship between $P_i$ and $F_i$ beforehand determined is used.

When there is, among all $P_i$, no $P_i$ that is equal to $P_D$, the larger one of $F_i$ corresponding to "the smallest $P_i$ that exceeds $P_D$" and $F_i$ corresponding to "the largest $P_i$ that is less than $P_D$" (when these two values are equal, the very value) is set as $F_{DS}$ in order to judge on the safer side whether reforming is possible or not.

Next, this $F_{DS}$ is compared with the above calculated reformable flow rate $F^R$.

Case where $F_{DS} \leq F^R$

When $F_{DS}$ is equal to or less than the reformable flow rate $F^R$, the electrical output of the fuel cell is set to $P_D$, and the flow rate of the hydrocarbon-based fuel supplied to the reforming catalyst layer is set to $F_{DS}$. $F_{DS} \leq F^R$ means that the hydrocarbon-based fuel at the flow rate $F_{DS}$ can be reformed in the reforming catalyst layer.

Case where $F_{DS} > F^R$

When $F_{DS}$ exceeds the above calculated reformable flow rate $F^R$, the following step (1-1) or (1-2) is performed. $F_{DS} > F^R$ means that the hydrocarbon-based fuel at the flow rate $F_{DS}$ cannot be totally reformed in the reforming catalyst layer.

(1-1) Case where there is a $P_i$ Corresponding to $F_i$ that is Equal to or Less than $F^R$, within a Range of Less than Fuel Cell Output Demand Value $P_D$ In this case, the electrical output of the fuel cell is set to the maximum value among the $P_i$ ($P_i$ that is less than $P_D$ and that corresponds to $F_i$ that is equal to or less than $F^R$), and the flow rate of the hydrocarbon-based fuel supplied to the reforming catalyst layer is set to $F_i$ that corresponds to this maximum value. This operation is intended to output an electrical output as much as possible from the fuel cell.

(1-2) Case where there is No $P_i$ Corresponding to $F_i$ that is Equal to or Less than $F^R$, within a Range of Less than Fuel Cell Output Demand Value $P_D$ In this case, the electric power generation of the fuel cell is stopped, and the flow rate of the hydrocarbon-based fuel supplied to the reforming catalyst layer is set to the reformable flow rate $F^R$. Here, the flow rate of the hydrocarbon-based fuel supplied to the reforming catalyst layer is set to the reformable flow rate $F^R$ in order to continue running the system. After this operation, it is possible to increase the temperature of the reformer (reforming catalyst layer) by a heater annexed to the reformer, a burner, or the like and wait for $F^R$ to increase (become $F_{DS} \leq F^R$). When $F_{DS} \leq F^R$, the step 1-D and the subsequent steps may be performed.

<Step 1-d2>

As described above, the step 1-d2 is performed when it is judged that the electrical output of the fuel cell is insufficient for the fuel cell output demand value $P_D$.

In this step, $F_M$ ($F_i$ corresponding to the maximum electrical output $P_M$) is compared with the above calculated reformable flow rate $F^R$.

Case where $F_M \leq F^R$

When $F_M$ is equal to or less than the above calculated reformable flow rate $F^R$, the electrical output of the fuel cell is set to $P_M$, and the flow rate of the hydrocarbon-based fuel supplied to the reforming catalyst layer is set to $F_M$. $F_M \leq F^R$ means that the hydrocarbon-based fuel at the flow rate $F_M$ can be reformed in the reforming catalyst layer.

Case where $F_M > F^R$

When $F_M$ exceeds the above calculated reformable flow rate $F^R$, the following step (1-3) or (1-4) is performed. $F_M > F^R$ means that the hydrocarbon-based fuel at the flow rate $F_M$ cannot be totally reformed in the reforming catalyst layer.

(1-3) Case where there is a $P_i$ Corresponding to $F_i$ that is Equal to or Less than $F^R$ In this case, the electrical output of the fuel cell is set to the maximum value of $P_i$ corresponding to $F_i$ that is equal to or less than $F^R$, and the flow rate of the hydrocarbon-based fuel supplied to the reforming catalyst layer is set to $F_i$ corresponding to this maximum value. This operation is intended to output an electrical output as much as possible from the fuel cell.

(1-4) Case where there is No $P_i$ Corresponding to $F_i$ that is Equal to or Less than $F^R$ In this case, the electric power generation of the fuel cell is stopped, and the flow rate of the hydrocarbon-based fuel supplied to the reforming catalyst layer is set to the reformable flow rate $F^R$. Here, the flow rate of the hydrocarbon-based fuel supplied to the reforming catalyst layer is set to the reformable flow rate $F^R$ in order to continue running the system. After this operation, it is possible to increase the temperature of the reformer (reforming catalyst layer) by a heater annexed to the reformer, a burner, or the like and wait for $F^R$ to increase (become $F_{DS} \leq F^R$). When $F_{DS} \leq F^R$, the step 1-D and the subsequent steps may be performed.

[Example of Load Following Operation in First Embodiment]

How operation is performed under various conditions, when the load following operation of one certain fuel cell system is performed, will be described below by giving specific examples. However, the present invention is not limited thereto.

First, it is assumed that for a fuel cell system, electrical outputs $P_i$ and a flow rate $F_i$ of the hydrocarbon-based fuel corresponding to each $P_i$ are beforehand set as shown in Table 1-1. Here, $P_M$=700 W and $F_{min}$=1 g/min. These are values inherent to this fuel cell system. On the other hand, $P_D$ can fluctuate according to electric power demand, and $F^R$ can fluctuate according to the reforming catalyst layer temperature. In addition, M=7, that is, seven different $P_i$ are set.

TABLE 1-1

| i | $P_i$ (W) | $F_i$ (g/min) |
|---|---|---|
| 1 | 0 | 2 |
| 2 | 200 | 3 |
| 3 | 300 | 3 |
| 4 | 400 | 4 |
| 5 | 500 | 3 |
| 6 | 600 | 1 |
| 7 (=M) | 700 | 7 |

The temperature of the reforming catalyst layer is measured in the step 1-A, and the reformable flow rate $F^R$ is calculated in the step 1-B.

(Case 1-1) A Case where $P_D$=450 W and $F^R$=5 g/min is Considered.

In this case, $F^R$=5 g/min≥1 g/min=$F_{min}$, and therefore, the step 1-C is not performed, and the step 1-D is performed.

Then, $P_D$=450 W<700 W=$P_M$, and therefore, the step 1-d1, rather than the step 1-d2, is performed.

In the step 1-d1, first, $F_{DS}$ is obtained. From Table 1-1, it is seen that there is no $P_i$ that is equal to $P_D$ (450 W). Therefore, "$F_i$ corresponding to the smallest $P_i$ that exceeds $P_D$" and "$F_i$ corresponding to the largest $P_i$ that is less than $P_D$" are obtained from Table 1-1. The smallest $P_i$ that exceeds $P_D$ is 500 W ($P_5$), and $F_i$ ($F_5$) corresponding to $P_5$ is 3 g/min. The largest $P_i$ that is less than $P_D$ is 400 W ($P_4$), and $F_i$ ($F_4$) corresponding to $P_4$ is 4 g/min. The not smaller one of $F_5$ and $F_4$, that is, $F_4$, is set as $F_{DS}$. Therefore, $F_{DS}$=4 g/min.

$F_{DS}$ is compared with $F^R$. $F_{DS}$=4 g/min≤5 g/min=$F^R$, and therefore, the electrical output of the fuel cell is set to $P_D$, that is, 450 W, and the flow rate of the hydrocarbon-based fuel supplied to the reforming catalyst layer is set to $F_{DS}$, that is, 4 g/min.

(Case 1-2) A Case where $P_D$=350 W and $F^R$=3 g/min is Considered.

In this case, $F^R$=3 g/min≥1 g/min=$F_{min}$, and therefore, the step 1-C is not performed, and the step 1-D is performed.

Then, $P_D$=350 W<700 W=$P_M$, and therefore, the step 1-d1, rather than the step 1-d2, is performed.

In the step 1-d1, first, $F_{DS}$ is obtained. From Table 1-1, it is seen that there is no $P_i$ that is equal to $P_D$ (350 W). Therefore, "$F_i$ corresponding to the smallest $P_i$ that exceeds $P_D$, and "$F_i$ corresponding to the largest $P_i$ that is less than $P_D$" are obtained from Table 1-1. The smallest $P_i$ that exceeds $P_D$ is 400 W ($P_4$), and $F_i$ ($F_4$) corresponding to $P_4$ is 4 g/min. The largest $P_i$ that is less than $P_D$ is 300 W ($P_3$), and $F_i$ ($F_3$) corresponding to $P_3$ is 3 g/min. The not smaller one of $F_4$ and $F_3$, that is, $F_4$, is set as $F_{DS}$. Therefore, $F_{DS}$=4 g/min.

$F_{DS}$ is compared with $F^R$. $F_{DS}$=4 g/min>3 g/min=$F^R$, and therefore, the above-described step (1-1) or (1-2) is performed depending on the situation. Specifically, there is a $P_i$ that is less than $P_D$ and that corresponds to $F_i$ which is equal to or less than $F^R$, and therefore, the step (1-1) is performed.

$P_i$ corresponding to $F_i$ that is equal to or less than $F^R$, that is, 3 g/min, within the range of less than $P_D$, that is, less than 350 W, are $P_1$ (0 W), $P_2$, (200 W), and $P_3$ (300 W). The maximum value of these is $P_3$ (300 W). $F_i$ ($F_3$) corresponding to this maximum value $P_3$ is 3 g/min.

Therefore, the electrical output of the fuel cell is set to this maximum value $P_3$, that is, 300 W, and the flow rate of the hydrocarbon-based fuel supplied to the reforming catalyst layer is set to $F_i$ ($F_3$) corresponding to this maximum value $P_3$, that is, is set to 3 g/min.

(Case 1-3) A Case where $P_D$=350 W and $F^R$=1 g/min is Considered.

In this case, $F^R$=1 g/min≥1 g/min=$F_{min}$, and therefore, the step 1-C is not performed, and the step 1-D is performed.

Then, $P_D$=350 W<700 W=$P_M$, and therefore, the step 1-d1, rather than the step 1-d2, is performed.

In the step 1-d1, first, $F_{DS}$ is obtained. From Table 1-1, it is seen that there is no $P_i$ that is equal to $P_D$ (350 W). Therefore, "$F_i$ corresponding to the smallest $P_i$ that exceeds $P_D$," and "$F_i$ corresponding to the largest $P_i$ that is less than $P_D$" are obtained from Table 1-1. The smallest $P_i$ that exceeds $P_D$ is 400 W ($P_4$), and $F_i$ ($F_4$) corresponding to $P_4$ is 4 g/min. The largest $P_i$ that is less than $P_D$ is 300 W ($P_3$), and $F_i$ ($F_3$) corresponding to $P_3$ is 3 g/min. The not smaller one of $F_4$ and $F_3$, that is, $F_4$, is set as $F_{DS}$. Therefore, $F_{DS}$=4 g/min.

$F_{DS}$ is compared with $F^R$. $F_{DS}$=4 g/min>1 g/min=$F^R$, and therefore, the above-described step (1-1) or (1-2) is performed depending on the situation. Specifically, there is no $P_i$ that is less than $P_D$ and that corresponds to $F_i$, that is equal to or less than $F^R$, and therefore, the step (1-2) is performed. Particularly, $F_i$ corresponding to $P_i$ within the range of less than $P_D$ are $F_1$, $F_2$, and $F_3$, and these are all larger than $F^R$ (1 g/min). Therefore, there is no $P_i$ that is less than $P_D$ and that corresponds to $F_i$, that is equal to or less than $F^R$.

Therefore, in the step (1-2), the electric power generation of the fuel cell is stopped, and the flow rate of the hydrocarbon-based fuel supplied to the reforming catalyst layer is set to the reformable flow rate $F^R$ (1 g/min).

The correspondence shown in Table 1-1 is extreme for explanation. But, it is considered that practically, correspondence may often be close to correspondence as shown in Table 1-2. In Table 1-2, in a range in which the electrical output $P_i$ is small, that is, in a range in which the electrical output $P_i$ is 0 W or more and 300 W or less, the flow rate $F_i$ of the hydrocarbon-based fuel is fixed at 1.0 g/min in order to preferably maintain the SOFC at a temperature at which electric power can be generated. Also, in a range in which the electrical output $P_i$ is large, that is, in a range in which the electrical output $P_i$ is 400 W or more and the maximum electrical output $P_M$ (1000 W) or less, the flow rate $F_i$ of the hydrocarbon-based fuel increases from 1.5 g/min to 4.5 g/min, correspondingly to the increase of the electrical output $P_i$ in order to make electric power generation efficiency high.

TABLE 1-2

| i | $P_i$ (W) | $F_i$ (g/min) |
|---|---|---|
| 1 | 0 | 1.0 |
| 2 | 100 | 1.0 |
| 3 | 200 | 1.0 |
| 4 | 300 | 1.0 |
| 5 | 400 | 1.5 |
| 6 | 500 | 2.0 |
| 7 | 600 | 2.5 |
| 8 | 700 | 3.0 |
| 9 | 800 | 3.5 |
| 10 | 900 | 4.0 |
| 11 | 1000 | 4.5 |

[Calculation of Reformable Flow Rate (Calculation of $F^R$)]

The method for calculating the flow rate $F^R$ of the hydrocarbon-based fuel that can be reformed in the reforming catalyst layer, in the step 1-B, based on the temperature of the reforming catalyst layer measured in the step 1-A, will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having the carbon number of one). In other words, the reformable flow rate in the reforming catalyst layer may be any flow rate equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having the carbon number of two or more) in the gas at the outlet of the reforming catalyst layer has a concentration, which does not cause problems of anode degradation and flow blockage due to carbon deposition, or less. The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of oxidation reactions of the anode electrode. For example, when the anode electrode material is Ni, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the calculation of the reformable flow rate in the reforming catalyst layer is performed based on the measured temperature of the reforming catalyst layer.

The reformable flow rate $F^R$ in the reforming catalyst layer may be beforehand obtained as a function of the temperature T of the reforming catalyst layer by experiment ($F^R$ is represented also as $F^R(T)$ to explicitly show that it is a function of temperature). Also, it is possible to determine the reformable flow rate by dividing the function obtained by experiment by a safety factor, or offsetting the temperature to the safe side. The unit of $F^R(T)$ is, for example, mol/s. The reformable flow rate $F^R(T)$ may be a function of only the temperature T. But, this is not limiting, and the reformable flow rate $F^R$ may be a function having, in addition to the temperature T, a variable, such as the volume of the catalyst layer, or the concentration of the gas component, other than T. In this case, when the reformable flow rate $F^R$ is calculated, it is possible to appropriately obtain a variable other than T, and calculate the reformable flow rate $F^R$ from the variable other than T and the measured T.

The temperature measurement position in the reforming catalyst layer may be one point or a plurality of points. Also, for temperature conditions, a representative temperature, such as the average value of a plurality of points, or the like may be used.

It is possible to consider a plurality of divided regions into which the reforming catalyst layer is divided along the gas flow direction, measure temperatures at a plurality of points in the reforming catalyst layer at different positions along the gas flow direction, calculate one or more flow rates of the fuel that can be reformed in one or more of the plurality of divided regions, based on the temperatures, and set the total value of the calculated flow rate(s) as the flow rate of the fuel that can be reformed in the reforming catalyst layer.

[Load Following Operation Method (Second Embodiment)]

In the present invention, a plurality of electrical outputs $P_i$ of the fuel cell (i is an integer of 1 or more and M or less, where M is an integer of 2 or more) and a flow rate $F_i$ of the hydrocarbon-based fuel corresponding to each $P_i$ are beforehand set.

Each $F_i$ is a flow rate of the hydrocarbon-based fuel required to be supplied to the reforming catalyst layer to output the corresponding electrical output $P_i$ from the fuel cell. For example, the flow rate $F_i$ of the hydrocarbon-based fuel that corresponds to each $P_i$ may be set by beforehand determining an electric current and a fuel utilization rate for each $P_i$ by preliminary experiment, simulation, or the like so that the electric power generation efficiency is as high as possible, while the SOFC is maintained at a temperature at which electric power can be preferably generated.

Also, the flow rates of fluids supplied to the indirect internal reforming SOFC, other than the hydrocarbon-based fuel, and the input and output of electricity to and from the indirect internal reforming SOFC, other than the output of the fuel cell, may be beforehand set correspondingly to each $P_i$, as required. For example, in order to suppress carbon deposition, the flow rate of water supplied to the reformer may be set so that the steam/carbon ratio (ratio of the number of moles of water molecules to the number of moles of carbon atoms in the gas supplied to the reforming catalyst layer) is a predetermined value. The flow rate of air supplied to the reformer may be set so that the oxygen/carbon ratio (ratio of the number of moles of oxygen molecules to the number of moles of carbon atoms in the gas supplied to the reforming catalyst layer) is a predetermined value. The flow rate of fluids supplied to the indirect internal reforming SOFC, other than the water and air supplied to the reformer, and the input and output of electricity to and from the indirect internal reforming SOFC may be set by preliminary experiment, simulation, or the like so that the electric power generation efficiency is as high as possible, while the SOFC is maintained at a temperature at which electric power can be preferably generated. By doing so, these flow rates and electrical input and output may be determined using beforehand obtained functions, when the output of the fuel cell is set to a certain value P.

Each $P_i$ is 0 or more. In other words, for all i, $0 \leq P_i$. Also, $P_i$ increases with the increase of i. In other words, $P_i < P_{i+1}$ (here, i is an integer of 1 or more and M−1 or less). Therefore, $P_i$ that may be actually zero is only $P_1$.

Further, each $F_i$ is larger than 0. In other words, for all i, $0 < F_i$.

$P_i$ when i is M (that is, $P_M$) is the maximum electrical output of the fuel cell. $P_M$ is beforehand determined as one of the specifications of the fuel cell system.

The minimum value and the maximum value of all $F_i$ are represented as $F_{min}$ and $F_{max}$, respectively.

It is preferred to make M as large as possible within the allowable range of the memory of a control means, in terms of electric power generation efficiency.

Further, a plurality of temperatures $T_j$ of the reforming catalyst layer (j is an integer of 1 or more and N or less, where N is an integer of 2 or more) and a flow rate $G_j$ of the hydrocarbon-based fuel that corresponds to each $T_j$ are beforehand set.

Here, each $G_j$ is a flow rate of the hydrocarbon-based fuel that can be reformed in the reforming catalyst layer at the corresponding reforming catalyst layer temperature $T_j$.

Each $G_j$ is larger than 0. In other words, for all j, $0 < G_j$. Also, $G_j$ is the same value or increases with the increase of j. In other words, $G_j \leq G_{j+1}$ (here, j is an integer of 1 or more and N−1 or less).

$G_j$ ($G_N$) when j is N is equal to or more than $F_{max}$. In other words, $G_N \geq F_{max}$. $G_N$ is the flow rate of the hydrocarbon-based fuel that can be reformed in the reforming catalyst layer at the highest temperature considered, that is, the maximum value of the hydrocarbon-based fuel that can be reformed. If $G_N < F_{max}$, the hydrocarbon-based fuel at the flow rate $F_{max}$ cannot be reformed, and therefore, the fuel cell system is, of course, designed so that $G_N \geq F_{max}$.

By preferably repeatedly performing steps 2-A to 2-D, that is, repeatedly performing the step 2-A, the step 2-B, and the step 2-C or 2-D in this order, during load following operation, reforming can be more reliably performed to more reliably prevent the degradation of the anode.

[Step 2-A]

When load fluctuation operation is actually performed, the step 2-A of measuring the temperature of the reforming catalyst layer is performed. This measurement may be continuously performed while the load following operation is performed.

The step 2-A is performed to find the temperature T of the reforming catalyst layer used when a reformable flow rate $F^R$ described later is obtained. The step 2-A is preferably started in a time as short as possible from the point of time of the start of the load following operation. The step 2-A is preferably started immediately after the load following operation is started. When the monitoring (continuous measurement) of the temperature of the reforming catalyst layer has been performed since before the start of the load following operation, the temperature monitoring may be continuously performed as it has been.

An appropriate temperature sensor, such as a thermocouple, may be used for the temperature measurement.

[Step 2-B]

In the step 2-B, $G_j$ corresponding to the largest $T_j$ that is equal to or less than the temperature T (the temperature measured in the step 2-A) is adopted as the flow rate (reformable flow rate $F^R$) of the hydrocarbon-based fuel that can be reformed in the reforming catalyst layer at the temperature T. In other words, among beforehand set $T_j$, the largest $T_j$ within the range of the measured temperature T or less is selected. Then, $G_j$ corresponding to the selected $T_j$ is obtained from the correspondence relationship between $T_j$ and $G_j$, which has been beforehand set, and this $G_j$ is set as the reformable flow rate $F^R$.

[Step 2-C]

When the reformable flow rate $F^R$ obtained in the step 2-B is smaller than the minimum value $F_{min}$, electric power generation in the fuel cell is stopped. In other words, when $F^R < F_{min}$, the requisite minimum reformed gas cannot be reformed, and therefore, the electrical output of the fuel cell is set to zero. In this case, it is possible to increase the temperature of the reforming catalyst layer by a heater annexed to the reformer, a burner, or the like until at least $F^R \geq F_{min}$ is satisfied. When $F^R \geq F_{min}$, the step 2-D and the subsequent steps may be performed.

[Step 2-D]

When the reformable flow rate $F^R$ calculated in the step 2-B is equal to or more than the minimum value $F_{min}$, the step 2-D is performed.

In the step 2-D, when a fuel cell output demand value $P_D$ is equal to or less than the maximum electrical output $P_M$ of the fuel cell, step 2-d1 is performed. $P_D \leq P_M$ means that the fuel cell can output the fuel cell output demand value $P_D$.

Or, when the fuel cell output demand value $P_D$ exceeds the maximum electrical output $P_M$ of the fuel cell, step 2-d2 is performed. $P_D > P_M$ means that the electrical output of the fuel cell is insufficient for the fuel cell output demand value $P_D$.

<Step 2-d1>

In the step 2-d1, first, in order to make a further judgment, a value of $F_{DS}$ is obtained. Here, $F_{DS}$ has a meaning of a flow rate of the hydrocarbon-based fuel corresponding to a $P_i$ which is close to the fuel cell output demand value $P_D$, obtained for judging on the safe side whether reforming is possible or not.

Whether there is, among all $P_i$ beforehand set, a $P_i$ that is equal to the fuel cell output demand value $P_D$ is checked.

When there is a $P_i$ that is equal to $P_D$, $F_i$ that corresponds to the $P_i$ (=$P_D$) is obtained using the correspondence relationship between $P_i$ and $F_i$, which has been beforehand set, and this $F_i$ is set as $F_{DS}$. Also in the following descriptions, when obtaining $F_i$ that corresponds to $P_i$, or $P_i$ that corresponds to $F_i$, the correspondence relationship between $P_i$ and $F_i$ beforehand determined is used.

When there is, among all $P_i$, no $P_i$ that is equal to $P_D$, the larger one of $F_i$ corresponding to "the smallest $P_i$ that exceeds $P_D$" and $F_i$ corresponding to "the largest $P_i$ that is less than $P_D$" (when these two values are equal, the very value) is set as $F_{DS}$ in order to judge on the safer side whether reforming is possible or not.

Next, this $F_{DS}$ is compared with the above calculated reformable flow rate $F^R$.

Case where $F_{DS} \leq F^R$

When $F_{DS}$ is equal to or less than the reformable flow rate $F^R$, the electrical output of the fuel cell is set to $P_D$, and the flow rate of the hydrocarbon-based fuel supplied to the reforming catalyst layer is set to $F_{DS}$. $F_{DS} \leq F^R$ means that the hydrocarbon-based fuel at the flow rate $F_{DS}$ can be reformed in the reforming catalyst layer.

Case where $F_{DS} > F^R$

When $F_{DS}$ exceeds the above reformable flow rate $F^R$, the following step (2-1) or (2-2) is performed. $F_{DS} > F^R$ means that the hydrocarbon-based fuel at the flow rate $F_{DS}$ cannot be totally reformed in the reforming catalyst layer.

(2-1) Case where there is a $P_i$ Corresponding to $F_i$, that is Equal to or Less than $F^R$, within a Range of Less than Fuel Cell Output Demand Value $P_D$ In this case, the electrical output of the fuel cell is set to the maximum value of the $P_i$ ($P_i$ that is less than $P_D$ and that corresponds to $F_i$ that is equal to or less than $F^R$), and the flow rate of the hydrocarbon-based fuel supplied to the reforming catalyst layer is set to $F_i$ that corresponds to this maximum value. This operation is intended to output an electrical output as much as possible from the fuel cell.

(2-2) Case where there is No $P_i$ Corresponding to $F_i$, that is Equal to or Less than $F^R$, within a Range of Less than Fuel Cell Output Demand Value $P_D$ In this case, the electric power generation of the fuel cell is stopped, and the flow rate of the hydrocarbon-based fuel supplied to the reforming catalyst layer is set to the reformable flow rate $F^R$. Here, the flow rate of the hydrocarbon-based fuel supplied to the reforming catalyst layer is set to the reformable flow rate $F^R$ in order to continue running the system. After this operation, it is possible to increase the temperature of the reformer (reforming catalyst layer) by a heater annexed to the reformer, a burner, or the like and wait for $F^R$ to increase (become $F_{DS} \leq F^R$). When $F_{DS} \leq F^R$, the step 2-D and the subsequent steps may be performed.

<Step 2-d2>

As described above, the step 2-d2 is performed when it is judged that the electrical output of the fuel cell is insufficient for the fuel cell output demand value $P_D$.

In this step, $F_M$ ($F_i$ corresponding to the maximum electrical output $P_M$) is compared with the above reformable flow rate $F^R$.

Case where $F_M \leq F^R$

When $F_M$ is equal to or less than the above reformable flow rate $F^R$, the electrical output of the fuel cell is set to $P_M$, and the flow rate of the hydrocarbon-based fuel supplied to the reforming catalyst layer is set to $F_M$. $F_M \leq F^R$ means that the hydrocarbon-based fuel at the flow rate $F_M$ can be reformed in the reforming catalyst layer.

Case where $F_M > F^R$

When $F_M$ exceeds the above reformable flow rate $F^R$, the following step (2-3) or (2-4) is performed. $F_M > F^R$ means that the hydrocarbon-based fuel at the flow rate $F_M$ cannot be totally reformed in the reforming catalyst layer.

(2-3) Case where there is a $P_i$ Corresponding to $F_i$, that is Equal to or Less than $F^R$ In this case, the electrical output of the fuel cell is set to the maximum value of $P_i$ corresponding to $F_i$, that is equal to or less than $F^R$, and the flow rate of the hydrocarbon-based fuel supplied to the reforming catalyst layer is set to $F_i$ corresponding to this maximum value. This operation is intended to output an electrical output as much as possible from the fuel cell.

(2-4) Case where there is No $P_i$ Corresponding to $F_i$, that is Equal to or Less than $F^R$ In this case, the electric power generation of the fuel cell is stopped, and the flow rate of the hydrocarbon-based fuel supplied to the reforming catalyst layer is set to the reformable flow rate $F^R$. Here, the flow rate of the hydrocarbon-based fuel supplied to the reforming catalyst layer is set to the reformable flow rate $F^R$ in order to continue running the system. After this operation, it is possible to increase the temperature of the reformer (reforming catalyst layer) by a heater annexed to the reformer, a burner, or the like and wait for $F^R$ to increase (become $F_{DS} \leq F^R$). When $F_{DS} \leq F^R$, the step 2-D and the subsequent steps may be performed.

[Example of Load Following Operation in Second Embodiment]

How operation is performed under various conditions, when the load following operation of one certain fuel cell system is performed, will be described below by giving specific examples. However, the present invention is not limited thereto.

First, it is assumed that for a fuel cell system, electrical outputs $P_i$ and a flow rate $F_i$ of the hydrocarbon-based fuel corresponding to each $P_i$ are beforehand set as shown in Table 2-1. Here, $P_M = 700$ W and $F_{min} = 1$ g/min. These are values inherent to this fuel cell system. On the other hand, $P_D$ can fluctuate according to electric power demand, and $F^R$ can fluctuate according to the reforming catalyst layer temperature. In addition, M=7, that is, seven different $P_i$ are set.

TABLE 2-1

| i | $P_i$ (W) | $F_i$ (g/min) |
|---|---|---|
| 1 | 0 | 2 |
| 2 | 200 | 3 |
| 3 | 300 | 3 |
| 4 | 400 | 4 |
| 5 | 500 | 3 |
| 6 | 600 | 1 |
| 7 (=M) | 700 | 7 |

Also, it is assumed that for the same fuel cell system, temperatures $T_j$ of the reforming catalyst layer, and a flow rate $G_j$ of the hydrocarbon-based fuel corresponding to each $T_j$ are beforehand set as shown in Table 2-2. Here, $T_N = 700°$ C. and $G_N = 8$ g/min. These are values inherent to the fuel cell system. N=5, that is, five different $T_j$ are set.

In addition, $G_N = 8$ g/min $\geq 7$ g/min $= F_M$.

TABLE 2-2

| j | $T_j$ (° C.) | $G_j$ (g/min) |
|---|---|---|
| 1 | 600 | 1 |
| 2 | 625 | 3 |
| 3 | 650 | 6 |
| 4 | 675 | 8 |
| 5 (N) | 700 | 8 |

The temperature T of the reforming catalyst layer is measured in the step 2-A.

(Case 2-1) A Case where $P_D = 450$ W and T=660° C. is Considered.

The step 2-B is performed. From Table 2-2, the largest $T_j$ within the range of T (660° C.) or less is $T_3$ (650° C.). $G_j$ ($G_3$) corresponding to $T_3$ is 6 g/min. $G_3$ is adopted as the reformable flow rate $F^R$. Therefore, $F^R = 6$ g/m in.

$F^R = 6$ g/min $\geq 1$ g/min $= F_{min}$, and therefore, the step 2-C is not performed, and the step 2-D is performed.

Then, $P_D = 450$ W $< 700$ W $= P_M$, and therefore, the step 2-d1, rather than the step 2-d2, is performed.

In the step 2-d1, first, $F_{DS}$ is obtained. From Table 2-1, it is seen that there is no $P_i$ that is equal to $P_D$ (450 W). Therefore, "$F_i$ corresponding to the smallest $P_i$ that exceeds $P_D$" and "$F_i$ corresponding to the largest $P_i$ that is less than $P_D$" are obtained from Table 2-1. The smallest $P_i$ that exceeds $P_D$ is 500 W ($P_5$), and $F_i$ ($F_5$) corresponding to $P_5$ is 3 g/min. The largest $P_i$ that is less than $P_D$ is 400 W ($P_4$), and $F_i$ ($F_4$) corresponding to $P_4$ is 4 g/min. The not smaller one of $F_5$ and $F_4$, that is, $F_4$, is set as $F_{DS}$. Therefore, $F_{DS} = 4$ g/min.

$F_{DS}$ is compared with $F^R$. $F_{DS} = 4$ g/min $\leq 6$ g/min $= F^R$, and therefore, the electrical output of the fuel cell is set to $P_D$, that is, 450 W, and the flow rate of the hydrocarbon-based fuel supplied to the reforming catalyst layer is set to $F_{DS}$, that is, 4 g/min.

(Case 2-2) A Case where $P_D = 350$ W and T=630° C. is Considered.

The step 2-B is performed. From Table 2-2, the largest $T_j$ within the range of T (630° C.) or less is $T_2$ (625° C.). $G_j$ ($G_2$) corresponding to $T_2$ is 3 g/min. $G_2$ is adopted as the reformable flow rate $F^R$. Therefore, $F^R = 3$ g/min.

$F^R = 3$ g/min $\geq 1$ g/min $= F_{min}$, and therefore, the step 2-C is not performed, and the step 2-D is performed.

Then, $P_D = 350$ W $\leq 700$ W $= P_M$, and therefore, the step 2-d1, rather than the step 2-d2, is performed.

In the step 2-d1, first, $F_{DS}$ is obtained. From Table 2-1, it is seen that there is no $P_i$ that is equal to $P_D$ (350 W). Therefore, "$F_i$ corresponding to the smallest $P_i$ that exceeds $P_D$" and "$F_i$ corresponding to the largest $P_i$ that is less than $P_D$" are obtained from Table 2-1. The smallest $P_i$ that exceeds $P_D$ is 400 W ($P_4$), and $F_i$ ($F_4$) corresponding to $P_4$ is 4 g/min. The largest $P_i$ that is less than $P_D$ is 300 W ($P_3$), and $F_i$ ($F_3$) corresponding to $P_3$ is 3 g/min. The not smaller one of $F_4$ and $F_3$, that is, $F_4$, is set as $F_{DS}$. Therefore, $F_{DS} = 4$ g/min.

$F_{DS}$ is compared with $F^R$. $F_{DS} = 4$ g/min $> 3$ g/min $= F^R$, and therefore, the above-described step (2-1) or (2-2) is performed depending on the situation. Specifically, there is a $P_i$ that is less than $P_D$ and that corresponds to $F_i$ that is equal to or less than $F^R$, and therefore, the step (2-1) is performed.

$P_i$ corresponding to $F_i$ that is equal to or less than $F^R$, that is, 3 g/min, within the range of less than $P_D$, that is, less than 350 W, are $P_1$ (0 W), $P_2$ (200 W), and $P_3$ (300 W). The maximum value of these is $P_3$ (300 W). $F_i$ ($F_3$) corresponding to this maximum value $P_3$ is 3 g/min.

Therefore, the electrical output of the fuel cell is set to this maximum value $P_3$, that is, 300 W, and the flow rate of the hydrocarbon-based fuel supplied to the reforming catalyst layer is set to $F_i$ ($F_3$) corresponding to this maximum value $P_3$, that is, is set to 3 g/min.

(Case 2-3) A Case where $P_D$=350 W and T=610° C. is Considered.

The step 2-B is performed. From Table 2-2, the largest $T_j$ within the range of T (610° C.) or less is $T_1$ (600° C.). $G_j$ ($G_1$) corresponding to $T_1$ is 1 g/min. $G_1$ is adopted as the reformable flow rate $F^R$. Therefore, $F^R$=1 g/min.

$F^R$=1 g/min≥1 g/min=$F_{min}$, and therefore, the step 2-C is not performed, and the step 2-D is performed.

Then, $P_D$=350 W<700 W=$P_M$, and therefore, the step 2-d1, rather than the step 2-d2, is performed.

In the step 2-d1, first, $F_{DS}$ is obtained. From Table 2-1, it is seen that there is no $P_i$ that is equal to $P_D$ (350 W). Therefore, "$F_i$ corresponding to the smallest $P_i$ that exceeds $P_D$" and "$F_i$ corresponding to the largest $P_i$ that is less than $P_D$" are obtained from Table 2-1. The smallest $P_i$ that exceeds $P_D$ is 400 W ($P_4$), and $F_i$ ($F_4$) corresponding to $P_4$ is 4 g/min. The largest $P_i$ that is less than $P_D$ is 300 W ($P_3$), and $F_i$ ($F_3$) corresponding to $P_3$ is 3 g/min. The not smaller one of $F_4$ and $F_3$, that is, $F_4$, is set as $F_{DS}$. Therefore, $F_{DS}$=4 g/min.

$F_{DS}$ is compared with $F^R$. $F_{DS}$=4 g/min>1 g/min=$F^R$, and therefore, the above-described step (2-1) or (2-2) is performed depending on the situation. Specifically, there is no $P_i$ that is less than $P_D$ and that corresponds to $F_i$, that is equal to or less than $F^R$, and therefore, the step (2-2) is performed. Particularly, $F_i$ corresponding to $P_i$ within the range of less than $P_D$ are $F_1$, $F_2$, and $F_3$, and these are all larger than $F^R$ (1 g/min). Therefore, there is no $P_i$ that is less than $P_D$ and that corresponds to $F_i$, that is equal to or less than $F^R$.

Therefore, in the step (2-2), the electric power generation of the fuel cell is stopped, and the flow rate of the hydrocarbon-based fuel supplied to the reforming catalyst layer is set to the reformable flow rate $F^R$ (1 g/min).

The correspondence shown in Table 2-1 is extreme for explanation. But, it is considered that practically, correspondence may often be close to correspondence as shown in Table 2-3. In Table 2-3, in a range in which the electrical output $P_i$ is small, that is, in a range in which the electrical output $P_i$ is 0 W or more and 300 W or less, the flow rate $F_i$ of the hydrocarbon-based fuel is fixed at 1.0 g/min in order to preferably maintain the SOFC at a temperature at which electric power can be generated. Also, in a range in which the electrical output $P_i$ is large, that is, in a range in which the electrical output $P_i$ is 400 W or more and the maximum electrical output $P_M$ (1000 W) or less, the flow rate $F_i$ of the hydrocarbon-based fuel increases from 1.5 g/min to 4.5 g/min, correspondingly to the increase of the electrical output $P_i$ in order to make electric power generation efficiency high.

TABLE 2-3

| i | $P_i$ (W) | $F_i$ (g/min) |
|---|---|---|
| 1 | 0 | 1.0 |
| 2 | 100 | 1.0 |
| 3 | 200 | 1.0 |
| 4 | 300 | 1.0 |
| 5 | 400 | 1.5 |
| 6 | 500 | 2.0 |
| 7 | 600 | 2.5 |
| 8 | 700 | 3.0 |
| 9 | 800 | 3.5 |
| 10 | 900 | 4.0 |
| 11 | 1000 | 4.5 |

[Way of Setting $T_j$ and $G_j$ Corresponding to $T_j$]

Way of Setting $T_j$

When the measured temperature T of the catalyst layer is smaller than the minimum value of $T_j$, the step 2-B cannot be performed. Therefore, the minimum value of $T_j$ is more preferably as small as possible and may be, for example, the lowest temperature among temperatures at which the flow rate of the hydrocarbon-based fuel that can be reformed exceeds zero.

It is preferred to make N as large as possible within the allowable range of the memory of a control means, in terms of electric power generation efficiency. Particularly, when the increase rate of the flow rate of the hydrocarbon-based fuel that can be reformed increases as the catalyst layer temperature increases, it is preferred to make the interval between $T_j$ smaller as the temperature increases.

Way of Setting $G_j$ $G_j$ is a flow rate of the hydrocarbon-based fuel that can be reformed in the reforming catalyst layer at the corresponding reforming catalyst layer temperature $T_j$. Therefore, the flow rate $G_j$ of the hydrocarbon-based fuel that can be reformed in the reforming catalyst layer, when the temperature of the reforming catalyst layer is the temperature $T_j$, is beforehand obtained, and the correspondence relationship between $T_j$ and $G_j$ is beforehand set. The way of obtaining $G_j$ will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the anode of the fuel cell.

For example, the reformable flow rate in the reforming catalyst layer may be any flow rate that is equal to or less than the maximum value of flow rates at which the supplied hydrocarbon-based fuel can be decomposed to a C1 compound(s) (a compound(s) having the carbon number of one). In other words, the reformable flow rate in the reforming catalyst layer may be any flow rate that is equal to or less than the maximum value of the flow rate of the hydrocarbon-based fuel supplied to the reforming catalyst layer when reforming can proceed in the reforming catalyst layer until a composition is obtained in which a C2+ component(s) (a component(s) having the carbon number of two or more) in the gas at the outlet of the reforming catalyst layer has a concentration, which does not cause problems of anode degradation and flow blockage due to carbon deposition, or less. The concentration of the C2+ component(s) in this case is preferably 50 ppb or less as a mass fraction in the reformed gas. And in this case, it is enough that the gas at the outlet of the reforming catalyst layer is reducing gas. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing.

With respect to the reducing property of the gas at the outlet of the reforming catalyst layer, it is enough that the property is to the extent that if this gas is supplied to the anode, the oxidative degradation of the anode is suppressed. In order to do this, for example, the partial pressures of oxidizing $O_2$, $H_2O$, and $CO_2$, and the like contained in the gas at the outlet of the reforming catalyst layer may be lower than their equilibrium partial pressures of the oxidation reactions of the anode electrode. For example, when the anode electrode material is Ni, and the anode temperature is 800° C., the partial pressure of $O_2$ contained in the gas at the outlet of the reforming catalyst layer may be less than $1.2 \times 10^{-14}$ atm ($1.2 \times 10^{-9}$ Pa), the partial pressure ratio of $H_2O$ to $H_2$ may be less than $1.7 \times 10^2$, and the partial pressure ratio of $CO_2$ to CO may be less than $1.8 \times 10^2$.

The reformable flow rate depends on the temperature of the reforming catalyst layer. Therefore, the calculation of the reformable flow rate in the reforming catalyst layer is performed based on the temperature of the reforming catalyst layer.

The reformable flow rate $G_j$ may be beforehand obtained as a function of the temperature $T_j$ of the reforming catalyst layer by experiment. Also, it is possible to determine the reformable flow rate by dividing the function obtained by experiment by a safety factor, or offsetting the temperature to the safe side. The unit of $G_j$ is, for example, g/min or mol/s. The reformable flow rate $G_j$ may be a function of only the temperature $T_j$. But, this is not limiting, and the reformable flow rate $G_j$ may be a function having, in addition to the temperature $T_j$, a variable, such as the volume of the catalyst layer, or the concentration of the gas component, other than $T_j$. In this case, when the reformable flow rate $G_j$ is calculated, it is possible to appropriately obtain a variable other than $T_j$, and calculate the reformable flow rate $G_j$ from the variable other than $T_j$ and the measured In preliminary experiment for obtaining $G_j$, the temperature measurement position in the reforming catalyst layer may be one point or a plurality of points. Also, a representative temperature, such as the average value of a plurality of points, or the like may be used as the temperature of the reforming catalyst layer.

It is possible to consider a plurality of divided regions into which the reforming catalyst layer is divided along the gas flow direction, measure temperatures at a plurality of points in the reforming catalyst layer at different positions along the gas flow direction, calculate one or more flow rates of the fuel that can be reformed in one or more of the plurality of divided regions, based on the temperatures, and set the total value of the calculated flow rate(s) as the flow rate of the fuel that can be reformed in the reforming catalyst layer.

When the temperature T of the reforming catalyst layer during actual operation is obtained in the step 2-A, it is desired to measure the temperature of the reforming catalyst layer as in the preliminary experiment for obtaining $G_j$. In other words, it is desired to measure the temperature of the reforming catalyst layer at the same position(s) as in the preliminary experiment. When a representative temperature or the like is used in the preliminary experiment, it is desired to use the same representative temperature as the temperature T of the reforming catalyst layer also in the step 2-A.

[Others]

It is not always necessary to perform the same type of reforming during the load following operation. More particularly, it is possible to perform reforming, while changing the flow rate of the hydrocarbon-based fuel stepwise, during the load following operation, and it is not always necessary to perform the same type of reforming at each stage.

Also, by interconnecting the fuel cell to a system power supply, the shortage of the electrical output of the fuel cell with respect to an electric power load may be supplied from the system power supply.

The fuel cell output demand value $P_D$ may be the value of an electric power load measured by an appropriate electric power meter. Alternatively, when the fuel cell is interconnected to another power generator or storage battery, part of a measured electric power load may be set as the fuel cell output demand value $P_D$.

In the step (1-1) or the step (1-3), and in the step (2-1) or (2-3), when the flow rate of the hydrocarbon-based fuel is determined, it is possible to accordingly determine the flow rates of fluids supplied to the indirect internal reforming SOFC, other than the hydrocarbon-based fuel, and the input and output of electricity to and from the indirect internal reforming SOFC, other than the output of the SOFC to values beforehand set correspondingly to each $P_i$ (the same i-th values as that of the determined flow rate of the hydrocarbon-based fuel), as required.

The present invention is particularly effective when the hydrocarbon-based fuel supplied to the reforming catalyst layer includes a hydrocarbon-based fuel having the carbon number of two or more. According to the present invention, it is possible to allow the concentration of a compound(s) having the carbon number of two or more in the reformed gas to be 50 ppb or less on a mass basis even in load following operation. And thereby, anode degradation and flow blockage due to carbon deposition can be more reliably prevented.

[Another Embodiment of Indirect Internal Reforming SOFC System]

Figure 2:
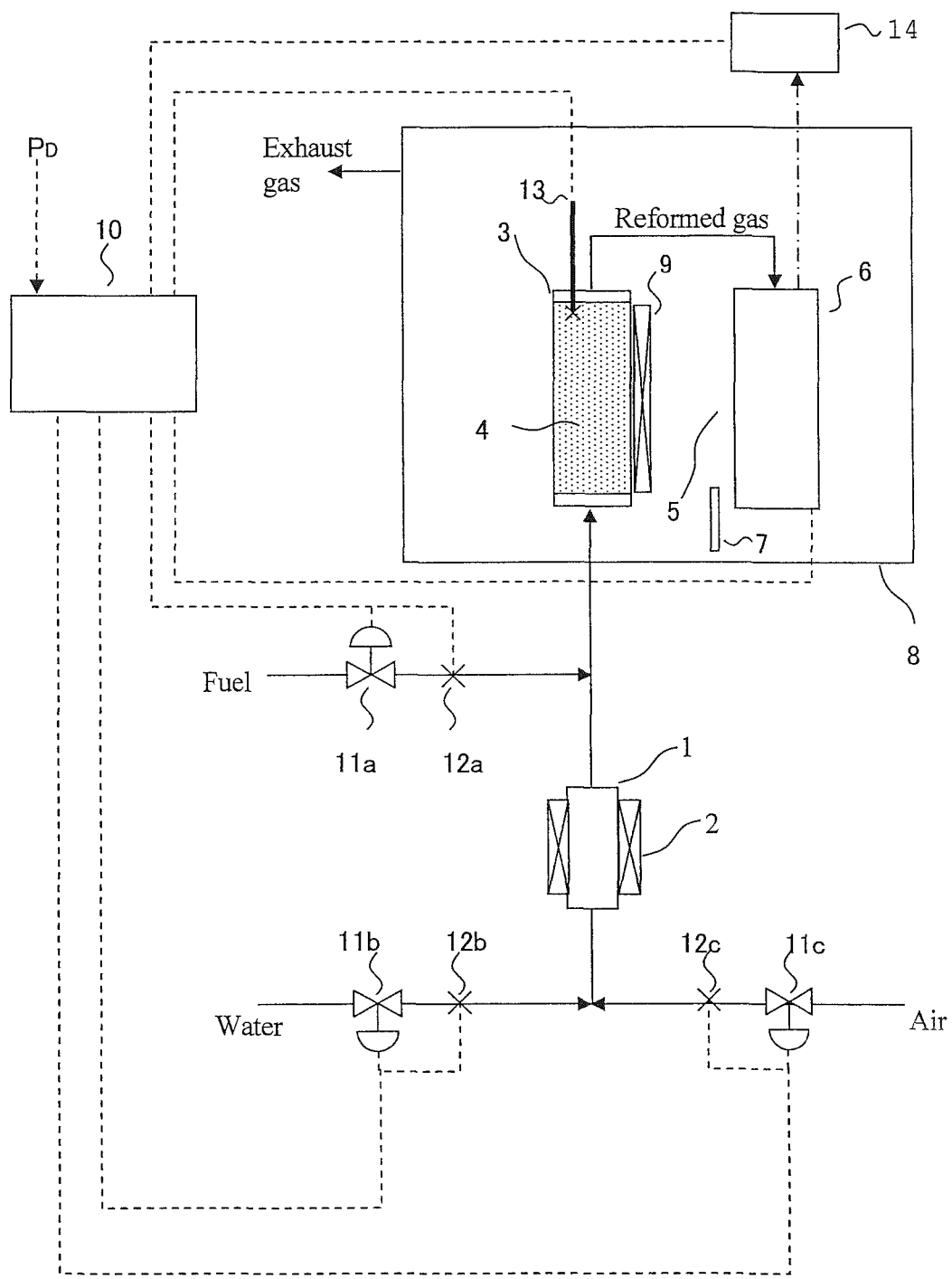
FIG. 2 is a schematic diagram showing the outline of another example of the indirect internal reforming SOFC system that can perform the present invention.

An embodiment of an indirect internal reforming SOFC system that can be suitably used to perform the above method will be described using FIG. 2.

This fuel cell system includes a reformer 3 for reforming a hydrocarbon-based fuel to produce a reformed gas containing hydrogen. The reformer includes a reforming catalyst layer 4. Also, this fuel cell system includes a high temperature fuel cell (here, SOFC) 6 for generating electric power using this reformed gas.

This fuel cell system further includes the following means I to IV.

I) A means for measuring the temperature T of the reforming catalyst layer.

II) A means for obtaining a reformable flow rate $F^R$ that is a flow rate of the hydrocarbon-based fuel that can be reformed in the reforming catalyst layer at the temperature T.

III) A means for, when the above reformable flow rate $F^R$ is smaller than the above minimum value $F_{min}$, stopping electric power generation in the fuel cell.

IV) A means for, when the above reformable flow rate $F^R$ is equal to or more than the above minimum value $F_{min}$, performing step d1 if a fuel cell output demand value $P_D$ is equal to or less than the above maximum electrical output $P_M$, and performing step d2 if the fuel cell output demand value $P_D$ exceeds the above maximum electrical output $P_M$.

The following means 1-II or means 2-II may be used as the means II.

1-II) A means for calculating a reformable flow rate $F^R$ that is a flow rate of the hydrocarbon-based fuel that can be reformed in the reforming catalyst layer, based on the measured temperature of the reforming catalyst layer.

2-II) A means for adopting $G_j$ that corresponds to the largest $T_j$, that is equal to or less than the temperature T, as a reformable flow rate $F^R$ that is a flow rate of the hydrocarbon-based fuel that can be reformed in the reforming catalyst layer at the above temperature T.

A temperature sensor, such as a thermocouple 13, for measuring the temperature of the reforming catalyst layer may be used for the means I.

A control means (appropriately including arithmetic function) publicly known in the field of process control or fuel cell system control, such as a computer 10, may be used for each of the means II, III, and IV. One control means may be used for each of the means II, III, and IV, or only one control means, for example, the computer 10, may be used for the means II, III, and IV. When a plurality of control means are used, these may appropriately send and receive required information to and from each other.

The control means may appropriately store constants, functions, tables, and the like. For example, the control means used for the means III may store the above minimum value $F_{min}$, and the control means used for the means IV may store $F_{min}$, $P_M$, and all $P_i$. When the above means 1-II is used, the control means used for the means 1-II may store a function $F^R(T)$ for calculating the above function $F^R$. Also, when the above means 2-II is used, the control means used for the means 2-II may store a plurality of temperatures $T_j$ of the reforming catalyst layer, and the flow rate $G_j$ of the hydrocarbon-based fuel corresponding to each $T_j$.

Required values may be appropriately input to the control means. For example, a reforming catalyst layer temperature is input to the control means used for the means II. In other words, this control means may receive a signal corresponding to a reforming catalyst layer temperature. Also, the control means used for the means IV may receive a signal corresponding to $P_D$.

The control means used for the means III, and the control means used for the means IV may stop electric power generation in the fuel cell. Also, the control means used for the means IV may control the electrical output of the fuel cell.

The means III and the means IV may include, in addition to the above control means, an electric power conditioner 14 to control the electrical output of the fuel cell.

The control means used for the means IV may control the flow rate of the hydrocarbon-based fuel supplied to the reforming catalyst layer. The means IV may include, in addition to the above control means, a flow rate control valve 11a and a flowmeter 12a for the hydrocarbon-based fuel to control the flow rate of the hydrocarbon-based fuel supplied to the reforming catalyst layer. Alternatively, the means IV may include a pump for the hydrocarbon-based fuel that can vary the flow rate according to the input signal.

The fuel cell system may be equipped with, for example, a flow rate control valve 11b and a flowmeter 12b for water, as required, to supply steam to the reforming catalyst layer. Alternatively, the fuel cell system may be equipped with a pump for water that can vary the flow rate according to the input signal. Also, the fuel cell system may be equipped with, for example, a flow rate control valve 11c and a flowmeter 12c for air, as required, to supply an oxygen-containing gas to the reforming catalyst layer. Alternatively, the fuel cell system may be equipped with a blower for air that can vary the flow rate according to the input signal.

[Hydrocarbon-Based Fuel]

It is possible to use a hydrocarbon-based fuel appropriately selected from compounds of which molecules contain carbon and hydrogen (may also contain other elements, such as oxygen) or mixtures thereof that are publicly known as raw materials of reformed gas in the field of high temperature fuel cells. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, a high temperature fuel cell power generating equipment using kerosene or LPG is useful as an emergency power supply. Particularly, kerosene is preferred because it is easy to handle.

[High Temperature Fuel Cell]

The present invention may be suitably applied to a system equipped with a high temperature fuel cell in which anode degradation and flow blockage due to carbon deposition may occur. Such a fuel cell includes an SOFC and an MCFC.

The SOFC may be appropriately selected for use from publicly known SOFCs having various shapes, such as planar and tubular SOFCs. In the SOFC, generally, an oxygen-ion conductive ceramic or a proton-ion conductive ceramic is used as the electrolyte.

The MCFC may also be appropriately selected for use from publicly known MCFCs.

The SOFC or the MCFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

Among high temperature fuel cells, an indirect internal reforming SOFC is excellent in that the thermal efficiency of the system can be increased. The indirect internal reforming SOFC has a reformer for producing a reformed gas containing hydrogen from a hydrocarbon-based fuel using a steam reforming reaction and an SOFC. In this reformer, a steam reforming reaction may be performed, and autothermal reforming in which a steam reforming reaction is accompanied by a partial oxidation reaction may be performed. In terms of the electric power generation efficiency of the SOFC, preferably, no partial oxidation reaction occurs after the completion of start-up. The autothermal reforming is designed so that steam reforming is predominant after the completion of start-up, and therefore, the reforming reaction is an overall endothermic reaction. Heat required for the reforming reaction is supplied from the SOFC. The reformer and the SOFC are housed in one module container and modularized. The reformer is disposed at a position where it receives thermal radiation from the SOFC. Thus, the reformer is heated by thermal radiation from the SOFC during electric power generation. Also, the SOFC may be heated by combusting an anode off-gas, which is discharged from the SOFC, at the cell outlet.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is is preferably as short as possible.

Each supply gas is supplied to the reformer or the SOFC, after being appropriately preheated as required.

The module container may be any appropriate container capable of housing the SOFC and the reformer. An appropriate material having resistance to the environment used, for example, stainless steel, may be used as the material of the container. A connection port is appropriately provided for the container for gas interfacing or the like.

Particularly when a cell outlet opens in the module container, the module container is preferably hermetic in order to prevent communication between the interior of the module container and the surroundings (atmosphere).

A combustion region is a region where the anode off-gas discharged from the anode of the SOFC can be combusted.

For example, the anode outlet is opened in the enclosure, and a space near the anode outlet may be the combustion region. This combustion may be performed using, for example, a cathode off-gas, as an oxygen-containing gas. In order to do this, a cathode outlet may be opened in the enclosure.

In order to combust a combustion fuel or the anode off-gas, an ignition means, such as an igniter, may be appropriately used.

[Reformer]

The reformer produces a reformed gas containing hydrogen from a hydrocarbon-based fuel.

In the reformer, any of steam reforming, partial oxidation reforming and autothermal reforming in which a steam reforming reaction is accompanied by a partial oxidation reaction may be performed.

In the reformer, a steam reforming catalyst having steam reforming activity, a partial oxidation reforming catalyst having partial oxidation reforming activity, or an autothermal reforming catalyst having both partial oxidation reforming activity and steam reforming activity may be appropriately used.

With respect to the structure of the reformer, a structure publicly known as that of a reformer may be appropriately used. For example, the structure of the reformer may be a structure having a region for housing a reforming catalyst in a vessel which can be closed to the atmosphere, and having an introduction port for fluids required for reforming and a discharge port for a reformed gas.

The material of the reformer may be appropriately selected for use from materials publicly known as those of reformers, considering resistance in the environment used.

The shape of the reformer may be an appropriate shape, such as a rectangular parallelepiped shape or a circular tube shape.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the SOFC.

[Reforming Catalyst]

A publicly known catalyst may be used for each of the steam reforming catalyst, the partial oxidation reforming catalyst and the autothermal reforming catalyst used in the reformer. Examples of the partial oxidation reforming catalyst include a platinum-based catalyst. Examples of the steam reforming catalyst include ruthenium-based and nickel-based catalysts. Examples of the autothermal reforming catalyst include a rhodium-based catalyst.

A temperature at which the partial oxidation reforming reaction can proceed is, for example, 200° C. or more. A temperature at which the steam reforming reaction can proceed is, for example, 400° C. or more.

[Operation Conditions of Reformer]

The conditions during load following operation of the reformer for each of steam reforming, autothermal reforming, and partial oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as NB, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. The oxygen-containing gas may be added so that the endothermic reaction accompanying the steam reforming reaction is balanced, and an amount of heat generation such that the temperature of the reforming catalyst layer and the SOFC can be maintained or increased is obtained. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected in the range of preferably 0.05 to 20, more preferably 0.1 to 10, and further preferably 0.2 to 5. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, the space velocity (LHSV) is selected in the range of preferably 0.1 to 30. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

In the high temperature fuel cell system used in the present invention, publicly known components of a high temperature fuel cell system may be appropriately provided as required. Specific examples of the publicly known components include a desulfurizer for reducing a sulfur content of a hydrocarbon-based fuel; a vaporizer for vaporizing a liquid; pressure increasing means for pressurizing various fluids, such as a pump, a compressor, and a blower; flow rate controlling means or flow path blocking/switching means for controlling the flow rate of a fluid, or blocking/switching the flow of a fluid, such as a valve; a heat exchanger for performing heat exchange and heat recovery; a condenser for condensing a gas; heating/warming means for externally heating various equipment with steam or the like; storage means of a hydrocarbon-based fuel and combustibles; an air or electrical system for instrumentation; a signal system for control; a control device; and an electrical system for output and powering; and the like.

INDUSTRIAL APPLICABILITY

The present invention can be applied to a high temperature fuel cell system used for, for example, a stationary or mobile electric power generation system and a cogeneration system.

The invention claimed is:

1. A method of load following operation of a fuel cell system comprising a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the method comprising:

A) measuring a temperature T of the reforming catalyst layer;

B) obtaining a reformable flow rate $F^R$ that is a flow rate of the hydrocarbon-based fuel capable of being reformed in the reforming catalyst layer at the temperature T;

C) when the reformable flow rate $F^R$ is smaller than the minimum value $F_{min}$, stopping electric power generation in the fuel cell; and D) when the reformable flow rate $F^R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) if there exists, amongst all $P_i$ values, a $P_i$ that is equal to the fuel cell output demand value $P_D$, then setting $F_i$, that corresponds to $P_i$, that is equal to $P_D$, as $F_{DS}$;

if there does not exist, amongst all $P_i$ values, a $P_i$ that is equal to the fuel cell output demand value $P_D$, then setting $F_i$, that is the not smaller value of the two Fi values, as $F_{DS}$; one of said two Fi values corresponding to the smallest $P_i$ that exceeds $P_D$, and the other of said two $F_i$ values corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$; and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ corresponding to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

2. A method of load following operation of a fuel cell system comprising a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the method comprising:

1-A) measuring a temperature of the reforming catalyst layer;

1-B) calculating a reformable flow rate $F^R$ that is a flow rate of the hydrocarbon-based fuel capable of being reformed in the reforming catalyst layer, based on the measured temperature of the reforming catalyst layer;

1-C) when the calculated reformable flow rate $F^R$ is smaller than the minimum value $F_{min}$, stopping electric power generation in the fuel cell; and 1-D) when the calculated reformable flow rate $F^R$ is equal to or more than the minimum value $F_{min}$, performing step 1-d1 if a fuel cell output demand value $P_D$ is equal to or less than the maximum electrical output $P_M$, and performing step 1-d2 if the fuel cell output demand value $P_D$ exceeds the maximum electrical output $P_M$, 1-d1) if there exists, amongst all $P_i$ values, a $P_i$ that is equal to the fuel cell output demand value $P_D$, then setting $F_i$, that corresponds to $P_i$, that is equal to $P_D$, as $F_{DS}$;

if there does not exist, amongst all $P_i$, a $P_i$ that is equal to the fuel cell output demand value $P_D$, then setting $F_i$, that is the not smaller value of the two Fi values, as $F_{DS}$; one of said two Fi values corresponding to the smallest $P_i$ that exceeds $P_D$, and the other of said two $F_i$ values corresponding to the largest $P_i$ that is less than $P_D$, when $F_{DS}$ is equal to or less than the calculated reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the calculated reformable flow rate $F^R$, if there exists a $P_i$ that is less than the fuel cell output demand value $P_D$ and that corresponds to $F_i$ that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$ that is equal to or less than $F^R$, then stopping electric power generation of the fuel cell, and setting the flow rate of the hydrocarbon-based fuel supplied to the reforming catalyst layer to the reformable flow rate $F^R$, 1-d2) when $F_M$ that is $F_i$, corresponding to the maximum electrical output $P_M$, is equal to or less than the calculated reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the calculated reformable flow rate $F^R$, if there exists a $P_i$ that corresponds to $F_i$ that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ corresponding to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

3. A method of load following operation of a fuel cell system comprising a reformer having a reforming catalyst layer, for reforming a hydrocarbon-based fuel to produce a reformed gas containing hydrogen, and a high temperature fuel cell for generating electric power using the reformed gas, wherein a plurality of electrical outputs $P_i$ of the fuel cell (i is an integer of 1 or more and M or less, where M is an integer of 2 or more) and a flow rate $F_i$ of the hydrocarbon-based fuel that corresponds to each $P_i$ are set beforehand, where each $F_i$ is a flow rate of the hydrocarbon-based fuel required to be supplied to the reforming catalyst layer in order to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, and a plurality of temperatures $T_j$ of the reforming catalyst layer (j is an integer of 1 or more and N or less, where N is an integer of 2 or more) and a flow rate $G_j$ of the hydrocarbon-based fuel that corresponds to each $T_j$ are set beforehand, where each $G_j$ is a flow rate of the hydrocarbon-based fuel capable of being reformed in the reforming catalyst layer at a corresponding reforming catalyst layer temperature $T_j$, each $G_j$ is larger than 0, and $G_j$ is the same value or increases with an increase of j, the method comprising:

2-A) measuring a temperature T of the reforming catalyst layer;

2-B) adopting $G_j$ corresponding to a largest $T_j$ that is equal to or less than the temperature T as a reformable flow rate $F^R$ that is a flow rate of the hydrocarbon-based fuel capable of being reformed in the reforming catalyst layer at the temperature T;

2-C) when the reformable flow rate $F^R$ is smaller than the minimum value stopping electric power generation in the fuel cell; and 2-D) when the reformable flow rate $F^R$ is equal to or more than the minimum value $F_{min}$, performing step 2-d1 if a fuel cell output demand value $P_D$ is equal to or less than the maximum electrical output $P_M$, and performing step 2-d2 if the fuel cell output demand value $P_D$ exceeds the maximum electrical output $P_M$, 2-d1) if there exists, amongst all $P_i$ values, a $P_i$ that is equal to the fuel cell output demand value $P_D$, then setting $F_i$, that corresponds to $P_i$ that is equal to $P_D$, as $F_{DS}$;

if there does not exist, amongst all $P_i$, a $P_i$ that is equal to the fuel cell output demand value $P_D$, then setting $F_i$, that is the not smaller value of the two Fi values, as $F_{DS}$; one of said two Fi values corresponding to the smallest $P_i$ that exceeds $P_D$, and the other of said two $F_i$ values corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, 2-d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ corresponding to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

4. The method according to claim 1, wherein steps A to D are repeatedly performed during the load following operation.

5. The method according to claim 1, wherein the hydrocarbon-based fuel comprises a hydrocarbon-based fuel with a carbon number of two or more.

6. The method according to claim 5, wherein the concentration of a compound with a carbon number of two or more in the reformed gas is 50 ppb or less on a mass basis.

7. A fuel cell system comprising a reformer having a reforming catalyst layer, for reforming a hydrocarbon-based fuel to produce a reformed gas containing hydrogen, and a high temperature fuel cell for generating electric power using the reformed gas, wherein a plurality of electrical outputs of the fuel cell are represented as $P_i$ (i is an integer of 1 or more and M or less, where M is an integer of 2 or more), and a flow rate of the hydrocarbon-based fuel that corresponds to each $P_i$ is represented as $F_i$, where each $F_i$ is a flow rate of the hydrocarbon-based fuel required to be supplied to the reforming catalyst layer to output a corresponding electrical output $P_i$ from the fuel cell, each $P_i$ is 0 or more, $P_i$ increases with an increase of i, and each $F_i$ is larger than 0, $P_M$ that is $P_i$ when i is M is a maximum electrical output of the fuel cell, and a minimum value of all $F_i$ is represented as $F_{min}$, the system comprising:

I) a means for measuring a temperature T of the reforming catalyst layer;

II) a means for obtaining a reformable flow rate $F^R$ that is a flow rate of the hydrocarbon-based fuel capable of being reformed in the reforming catalyst layer at the temperature T;

III) a means for, when the reformable flow rate $F^R$ is smaller than the minimum value $F_{min}$, stopping electric power generation in the fuel cell; and IV) a means for, when the reformable flow rate $F^R$ is equal to or more than the minimum value $F_{min}$, performing step d1 if a fuel cell output demand value $P_D$ is equal to or less than the maximum electrical output $P_M$, and performing step d2 if the fuel cell output demand value $P_D$ exceeds the maximum electrical output $P_M$, d1) if there exists, amongst all $P_i$ values, a $P_i$ that is equal to the fuel cell output demand value $P_D$, then setting $F_i$, that corresponds to $P_i$, that is equal to $P_D$, as $F_{DS}$;

if there does not exist, amongst all $P_i$ values, a $P_i$ that is equal to the fuel cell output demand value $P_D$, then setting $F_i$, that is the not smaller value of the two Fi values, as $F_{DS}$; one of the said two Fi values corresponding to the smallest $P_i$ that exceeds $P_D$, and the other of said two $F_i$ values corresponding to the largest $P_i$ that is less than $P_D$, when $F_{DS}$ is equal to or less than the reformable flow rate $F^R$, setting an electrical output of the fuel cell to $P_D$, and setting a flow rate of the hydrocarbon-based fuel supplied to the reforming catalyst layer to $F_{DS}$, and when $F_{DS}$ exceeds the reformable flow rate $F^R$, if there exists a $P_i$ that is less than the fuel cell output demand value $P_D$ and that corresponds to $F_i$, that is equal to or less than $F^R$, then setting the electrical output of the fuel cell to the maximum value of $P_i$ that is less than $P_D$ and that corresponds to $F_i$, that is equal to or less than $F^R$; and setting the flow rate of the hydrocarbon-based fuel supplied to the reforming catalyst layer to $F_i$ that corresponds to this maximum value, and if there does not exist a $P_i$ that is less than the fuel cell output demand value $P_D$ and that corresponds to $F_i$, that is equal to or less than $F^R$, then stopping electric power generation of the fuel cell, and setting the flow rate of the hydrocarbon-based fuel supplied to the reforming catalyst layer to the reformable flow rate $F^R$, d2) when $F_M$ that is $F_i$, corresponding to the maximum electrical output $P_M$, is equal to or less than the reformable flow rate $F^R$, setting the electrical output of the fuel cell to $P_M$, and setting the flow rate of the hydrocarbon-based fuel supplied to the reforming catalyst layer to $F_M$, and when $F_M$ that is $F_i$, corresponding to the maximum electrical output $P_M$, exceeds the reformable flow rate $F^R$, if there exists a $P_i$ that corresponds to $F_i$, that is equal to or less than $F^R$, then setting the electrical output of the fuel cell to the maximum value of $P_i$ that corresponds to $F_i$, that is equal to or less than $F^R$, and setting the flow rate of the hydrocarbon-based fuel supplied to the reforming catalyst layer to $F_i$ corresponding to this maximum value, and if there does not exist a $P_i$ that corresponds to $F_i$, that is equal to or less than $F^R$, then stopping the electric power generation of the fuel cell, and setting the flow rate of the hydrocarbon-based fuel supplied to the reforming catalyst layer to the reformable flow rate $F^R$.

8. The method according to claim 2, wherein steps A to D are repeatedly performed during the load following operation.

9. The method according to claim 2, wherein the hydrocarbon-based fuel comprises a hydrocarbon-based fuel with a carbon number of two or more.

10. The method according to claim 9, wherein the concentration of a compound with a carbon number of two or more in the reformed gas is 50 ppb or less on a mass basis.

11. The method according to claim 3, wherein steps A to D are repeatedly performed during the load following operation.

12. The method according to claim 3, wherein the hydrocarbon-based fuel comprises a hydrocarbon-based fuel with a carbon number of two or more.

13. The method according to claim 12, wherein the concentration of a compound with a carbon number of two or more in the reformed gas is 50 ppb or less on a mass basis.

* * * * *